United States Patent Office 3,431,525
Patented Mar. 4, 1969

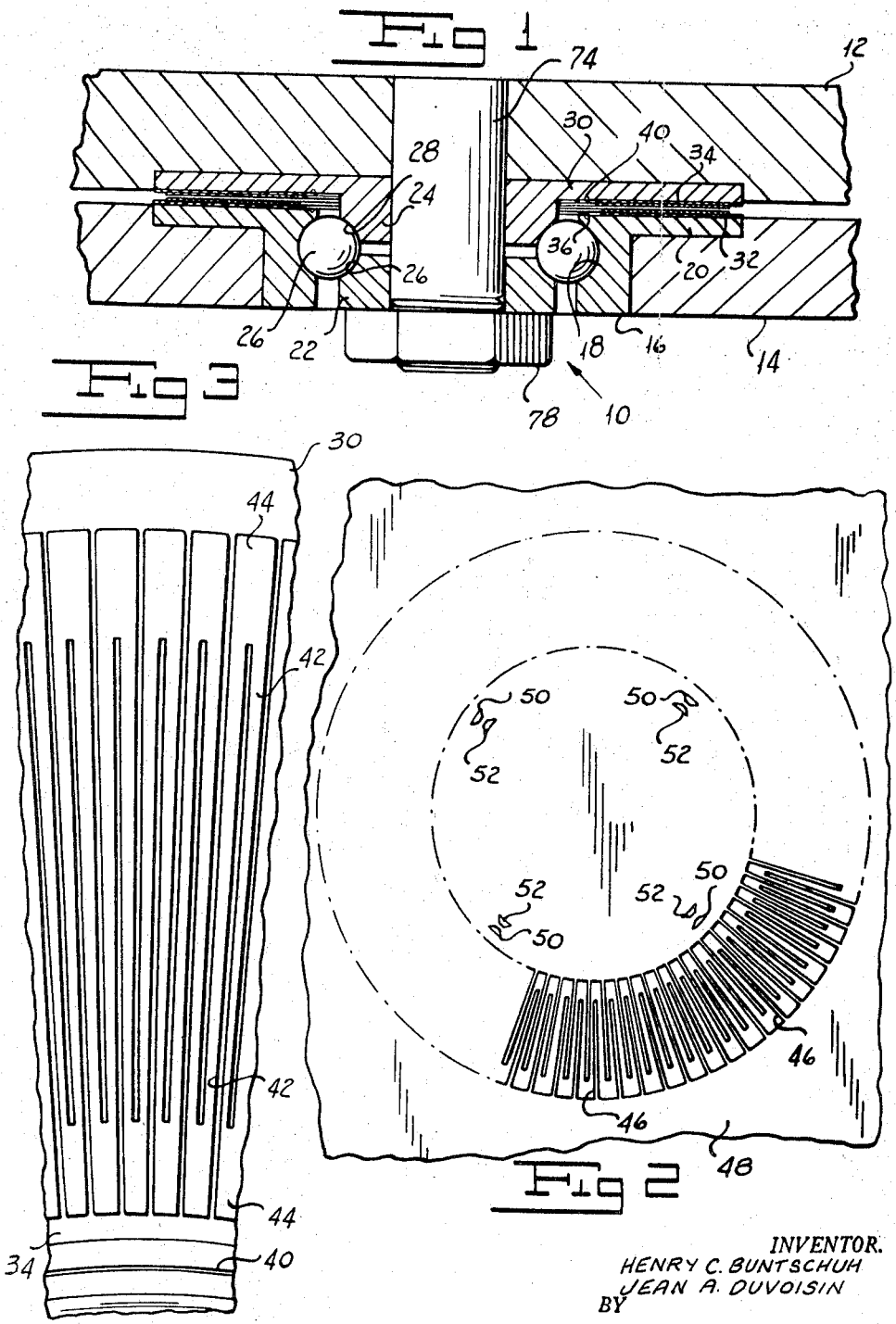

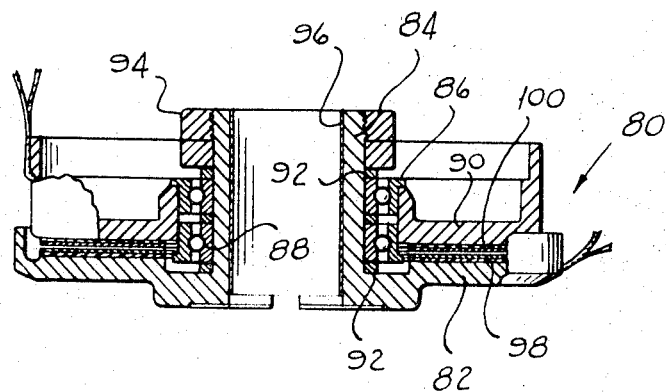
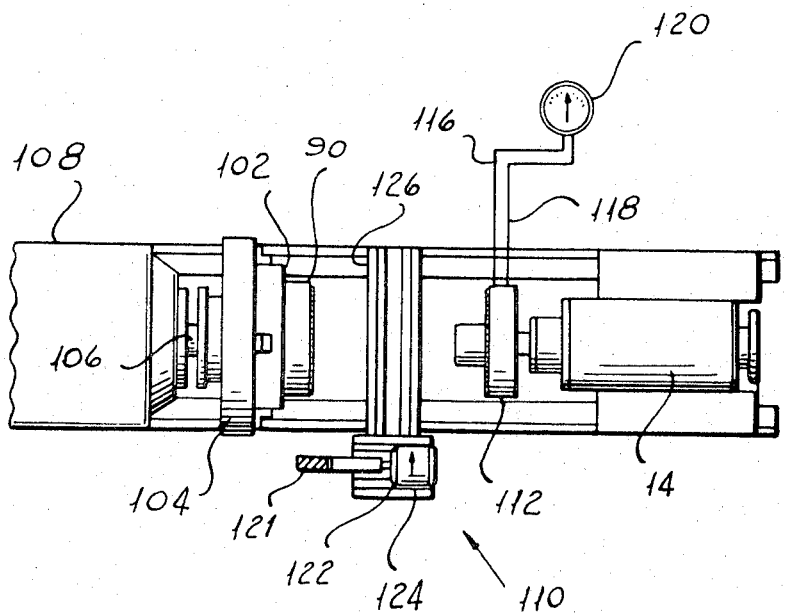

3,431,525
READILY ASSEMBLED RESOLVER HAVING MULTIPLE POLE PAIRS
Henry C. Buntschuh, New Hyde Park, N.Y., and Jean A. Duvoisin, Westport, Conn., assignors to United Aircraft Corporation, East Hartford, Conn., a corporation of Delaware
Original application May 4, 1962, Ser. No. 192,509, now Patent No. 3,332,144, dated July 25, 1967. Divided and this application Nov. 21, 1966, Ser. No. 606,490
U.S. Cl. 336—123     4 Claims
Int. Cl. H01f 21/04

ABSTRACT OF THE DISCLOSURE

An air gap device in which the members carrying inductively cooperating planar conductive patterns are integral with or are connected directly to race forming members between which rolling elements are disposed to provide a compact assembly. The members all are formed of the same material.

---

This application is a division of our copending application Ser. No. 192,509, filed May 4, 1962, now Patent No. 3,332,144.

There are known in the prior art resolvers having multiple pole pairs for producing an electrical signal indicating the relative rotary displacement of one member with relation to another. One form of this device includes conductive patterns deposited on glass plates which are mounted for relative rotation. The patterns are connected and energized to produce an output signal representing the relative rotary displacement between the two plates. These devices are manufactured and sold under the trademark "Inductosyn" which is the registered trademark of the Inductosyn Corporation for position data producing devices of the type described hereinabove. These devices, which will be identified by the term "Inductosyn" hereinafter throughout the specification are shown and described in U.S. Patent No. 2,614,171, issued Oct. 14, 1952 to L. Fein for Electrical Apparatus for Measuring Angles.

The Inductosyn is a high precision device which derives its accuracy from the precision and stability of the engraved circuit patterns carried by glass plates. In order to permit the Inductosyns to function with the high degree of accuracy of which they are capable, it is essential that the rotor and stator plates be installed with a high degree of concentricity. In the prior art special mounting flanges and adjustable centering means have been employed to permit the plates to be centered at the location at which they are installed. Even where the Inductosyn is supplied as a package some mechanical coupling must be provided between the package and the unit with which it is used, thus introducing additional errors not compensated for by the adjustable mounting means for the rotor and stator plates.

While the auxiliary centering means described above can successfully achieve the accurate centering required on installation the operation is a tedious and time-consuming one requiring a skilled technician for its performance. Not only is this true but also once the centering devices have been adjusted to cause the electrical centers of the devices to coincide with the mechanical axis of rotation they are no longer useful and become undesirable excess baggage. That is, once they have performed their function the centering means only add unwanted weight and occupy excessive space. As is well known in the art of airborne instruments, considerations of weight and space are of prime importance.

Owing to the unequal coefficient of expansion of the glass plates and the bearing rings or flanges carrying the plates in the prior art, changes in temperature may introduce undesirable errors.

We have invented an Inductosyn which does not require any auxiliary centering means at the location at which the device is installed. Our device has an electrical center which coincides with the mechanical axis of relative rotation of the device. The patterns of our Inductosyn may be mounted directly on parts of rotary structures to form integral parts thereof. The mounting members can be of the same material as the bearings so that changes in temperature do not appreciably affect the accuracy of our device. We have provided a method of making our improved Inductosyn.

One object of our invention is to provide an improved multiple pole pair resolver construction which overcomes the defects of similar devices of the prior art.

Another object of our invention is to provide an improved rotating electrical device which does not require auxiliary centering means for insuring that the electrical center coincides with the mechanical center of rotation.

A further object of our invention is to provide an Inductosyn which does not require the use of auxiliary centering means at the location at which it is installed.

Still another object of our invention is to provide an improved Inductosyn, the output of which is not seriously affected by changes in temperature.

A still further object of our invention is to provide a method for insuring that the electrical centers of Inductosyn rotor and stator patterns coincide with the axis of relative rotation of the members carrying the patterns.

Other and further objects of our invention will appear from the following description:

In general our invention contemplates the provision of an improved Inductosyn in which the electrical centers of the rotor and stator patterns are made to coincide with the mechanical center or axis of relative rotation of the members carrying the patterns in the course of manufacture of the rotor and stator. In one method of making our device we provide the bearing with a flange and mechanically scribe the flange with a reference circle. We then make a template of the pattern to be placed on the flange and provide the template with reference marks. We project the pattern and reference marks on the flange while covering photo-sensitive material under the pattern. We next adjust the position of the flange until the reference circle and reference marks are aligned to indicate that the pattern image is concentric with the bearing race. When this is done, the pattern is photo-etched onto the flange.

In another method of making our Inductosyn we apply the pattern to the rotor or stator, determine the electrical center of the pattern, and then machine the element to insure that its mechanical center coincides with the electrical center. In each of our methods, we may apply the pattern to a member made of the same material as the bearing so that changes in temperature will not adversely affect the operation of the device.

In the accompanying drawings which form part of the instant specification and which are to be read in conjunction therewith and in which like reference numerals are used to indicate like parts in the various views:

FIGURE 1 is a sectional view of our improved Inductosyn.

FIGURE 2 is a plan view of the template we employ in one form of our method of making our improved Inductosyn.

FIGURE 3 is a fragmentary view drawn on an enlarged scale of the patern which is to be applied to one of the Inductosyn members.

FIGURE 4 is a sectional view of an alternate form of our improved Inductosyn.

FIGURE 5 is a schematic view illustrating an alternate method of making our improved Inductosyn.

Referring now to FIGURE 1 of the drawings, one form of our Inductosyn indicated generally by the reference character 10 is adapted to produce an output signal indicating the relative rotary displacement of members 12 and 14. The Inductosyn 10 comprises a bearing having on outer ring 16 provided with a race 18 and with a flange 20 for the reception of one of the Inductosyn rotor or stator patterns in a manner to be described hereinabove. The bearing of the Inductosyn 10 includes a split inner ring made up of an inner ring half 22 and an inner ring half 24. The halves 22 and 24 have grooves or races 26 and 28 which make up the inner race of the bearing. We form the inner ring half 24 with a flange 30 adapted to carry the other of the rotor and stator patterns of the Inductosyn. These patterns may be applied, for example, on insulating material 32 and 34 on the respective flanges 20 and 30.

Referring now to FIGURES 1 to 3, in one method of making our improved Inductosyn, in the course of manufacture of the raceway 18, for example, we scribe a reference circle 36, concentric with the raceway 18, on the flange 20 inside the area which is to receive the Inductosyn pattern. Similarly, in making the inner ring race 28 we scribe a reference circle 40, concentric with the raceway 28, on the side of the flange 30 which faces flange 20 in the assembled bearing.

As can best be seen by reference to FIGURE 3 one of the Inductosyn patterns which is to be applied to a flange 20 or 30 includes a plurality of radially extending conductors 42 connected in series by conductive material 44. In this method of making our improved Inductosyn we apply the pattern including conductors 42 and material 44 by a photo-etching process. In accomplishing this result we first make a template 48 of opaque material, illustrated in FIGURE 2, into which we cut a pattern 46 corresponding to the pattern of conductors 42 and conductive material 44 which is to be applied to the flange 20 or 30. This pattern 46 is, in effect, the negative of the patern which is to be applied to the flange 20 or 30. In making the pattern 46 in the template 48, we use a ruling engine with a circular dividing head. Since the dividing head indexes with the same degree of accuracy no matter what diameter template is employed, selection of a large diameter would not be thought to contribute accuracy of the pattern produced. However, owing to the fact that the reciprocating motion of the head may not be as accurate as desired, we select a template 48 having a relatively large diameter. For example, if we assume that the cutter retraces within 10 microinches on a pattern having a mean radius of about 1 inch, the resulting angular error is about two seconds of arc. If a master plate having a diameter of five times the actual pattern diameter is used, the error of the resulting pattern is only a fraction of a second. For a reason which will be explained hereinafter, we provide the template 48 with four pairs of bracket type reference marks, each of which includes an outer mark 50 and an inner mark 52.

Having prepared the template 48 in the manner described above we next prepare the flanges 20 and 30 for the reception of the pattern. In the course of this operation we first place the insulating material 32 and 34 on the facing sides of the flanges. Next the insulating material is covered with conductive material as by plating. Assuming that the insulating films 32 and 34 will not impair a high vacuum by out-gassing, evaporation techniques may be used instead of a wet plating process. Alternatively to plating, we may cement a thin foil to the flange permitting the cement to act as the insulating material. After the conductive material has been applied to the flange, then it is coated with a photo-sensitive material which in turn is covered to prevent its exposure before the pattern has been centered in a manner more fully described in our copending application referred to hereinabove.

It is to be understood that while we have described a particular photo-etching technique for applying the pattern to the rotor flange 30 we could as well employ any other appropriate process. After we have completed the rotor we apply the proper pattern to the stator flange 20 in a similar manner. When both the parts have had their patterns applied thereto the rotor flange 30 is assembled on the shaft 74 of the member 12 and the balls 76 are placed on shaft 24 and a nut 78 is turned on the threaded end of the shaft to a distance which properly loads the bearing and gaps the rotor 30 and stator 20. Members 12 and 14 may be secured respectively to the rotor 30 with stator 20 in any suitable manner known to the art.

Referring now to FIGURE 4 we have shown an alternate form of our Inductosyn indicated generally by the reference character 80 including a stator housing or flange 82 having a hub 84 which carries bearings 86 and 88 for supporting the rotor housing or flange 90 of the assembly. Spacers 92 are provided for properly loading bearings 86 and 88 and for gapping the stator 82 and rotor 90. A preloading nut 94 is adapted to be turned down on the outside of hub 84 to apply the proper loading to the bearings. We may provide the hub 84 with a bore shield 96 disposed within the hub. Respective areas 98 and 100 of insulating material carry the stator and rotor conductive patterns.

In making the form of our Inductosyn 80 shown in FIGURE 4 we first apply the stator conductive pattern to the face of the flange 82 adjacent the rotor 90. This can be accomplished by any suitable manner known to the art such, for example, as by photo-etching or the like. As is known in the art and as will be apparent from the description given hereinabove, the pattern is radial and axiosymmetric in nature. Thus it will have a definite electrical center. In this form of our invention the flange 82 does not have any reference circle scribed thereon and while great care is taken it is likely that the electrical center of the pattern on the member 82 will not coincide precisely with the mechanical center of the bore of hub 84.

Referring now to FIGURE 5, after having applied the rotor pattern to the area of insulating material 100 we mount the member 90, for example, on the movable plate of a rectangular coordinate positioning device 102 similar to the device 56 shown in Duvoisin Patent No. 3,074,177. A suitable chuck 104 mounts the device 102 on the spindle 106 of the tailstock 108 of a lathe indicated generally by the reference character 110. It will thus be seen that the rotor 90 is mounted for rotation around an axis while being positionable in a plane which is perpendicular to the axis of rotation.

We mount a master stator 112 of known accuracy on the tailstock 114 of the lathe 110. We connect the output conductors 116 and 118 of stator 112 to a suitable indicating device such as a meter 120. Having accomplished the operations described above we move the tailstock 114 to the left as viewed in FIGURE 5 until it is in inductive relationship with the rotor 90 thus to form a completed Inductosyn. With the Inductosyn properly energized, we move the rotor 90 and stator 112 to their various relative positions while noting the readings of meter 120. In accordance as the meter reading varies from what its output should be, we actuate the device 102 to position rotor 90 to produce the correct output reading. When this has been done in all relative positions of the rotor and stator so that the proper output readings are produced we have determined the electrical center of the conductive pattern of the rotor 90. If this electrical center does not coincide with the mechanical center of the base of the flange 90, we machine the bore of the rotor 90 to cause its mechanical center to coincide with the electrical center just determined. This may readily be accomplished by means of a spindle grinding wheel 121 driven by a motor 122 carried by the cross slide 124 of the lathe. As is known in the art, slide 124 is carried in ways 126 which, in turn, can be moved left and right as viewed in FIGURE 5 along the bed of the lathe. With the wheel 120 in position within the bore of the rotor 90, as the spindle 106 turns one side of the bore of the rotor 90 will be ground down until the center of the bore coincides with the center of the electrical pattern which has been placed thereon.

It will be appreciated that in manufacturing a number of our Inductosyns we first make as many of the rotors 90 as are required for the completed assemblies. Having done this we take the same number of stators 82 and determine their electrical centers in a similar manner. When the center of a stator has been determined we may either grind the outside of the hub 84 or we may grind the hub bore. Assuming that a rotor 90 and a stator 82 have been formed in the manner described above with their mechanical centers of rotation corresponding precisely to the electrical centers of the patterns carried thereby we then assemble the rotor 90 and the stator 82 in inductive relationship by bearings 86 and 88, employing spacers 92 to insure that the plates are properly gapped and predetermined.

It will readily be appreciated that in each form of our invention the Inductosyn pattern is mounted on a member which has the same thermal coefficient of expansion as do the bearings. Thus the outputs of our device are not seriously affected by change in temperature.

In making our Inductosyn by the method illustrated in FIGURES 1 to 3 we scribe a reference circle such as the circle 40 on the member 30 during the course of formation of the race 28 so that the circle 40 is precisely concentric with the race. We next cut the template 48 to the pattern to be applied to the member 30 and from the template with the reference marks 50 and 52. Having done this we deposit metal on the insulating film 34 and cover the metal with photosensitive material. Next we proceed to form the pattern as described in our copending application.

In making our Inductosyn by the method illustrated in FIGURES 4 and 5 we apply the pattern to the member such for example as the member 90 by any means known to the art. We then mount the member 90 in the centering device 102 and rotate it with reference to a standard 112 and then adjust its position until the member 90 is mounted for rotation about the electrical center of the pattern. When this has been accomplished we grind the bore of the member 90 to make the center of the bore coincide with the electrical center of the pattern carried by the member 90.

It will be appreciated that the method illustrated in FIGURES 4 and 5 also compensates for errors which might otherwise be introduced by variations in pattern thickness and the like. By this method, too, the patterns can be applied directly to relatively rotatable members of the equipment the condition of which is to be sensed and these members can then be machined so that the electrical centers of the patterns coincide with the mechanical centers of the members. That is, the patterns can be made as integral parts of various rotating structures such as gyro gimbals and the like.

While we have shown and described our invention in connection with an inductive device it will readily be understood that it is equally applicable to any electrical air-gap device such as a capacitive device.

It will be seen that we accomplished the objectives of our invention. We have provided an Inductosyn which does not require any auxiliary centering means at the location at which it is installed. Our device has an electrical center which coincides with the center of rotation of the member carrying the pattern. The member carrying the pattern may be made of the same material as the bearing material so that the accuracy of our Inductosyn is not affected by changes in temperature.

It will be understood that certain features and sub-combinations are of utility and may be employed without reference to other features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A multiple pole pair resolver assembly including in combination a bearing comprising an inner ring and an outer ring and rolling elements disposed between said rings for relative rotation thereof around an axis, a first member carrying a first generally circularly disposed electrically conductive pattern providing a multiplicity of poles, said first pattern having an electrical center, said first member being fixedly mounted on said outer ring with said first pattern electrical center on said axis, and a second member carrying a second generally circularly disposed electrically conductive pattern providing a multiplicity of poles, said second electrically conductive pattern having an electrical center, said second member being fixedly mounted on said inner ring with said second pattern electrical center on said axis.

2. An assembly as in claim 1 in which said first and second members are formed of the same material as said rings.

3. An assembly as in claim 1 in which said first and second members comprise radially extending flanges providing surfaces facing each other and areas of insulating material for supporting said conductive patterns on said facing surfaces.

4. An assembly as in claim 1 in which said first and second members comprise radially extending flanges integrally formed with the respective bearing rings, said flanges providing surfaces which face each other and areas of insulating material for supporting said conductive patterns on said facing surfaces.

References Cited

UNITED STATES PATENTS

| | | | |
|---|---|---|---|
| 2,629,859 | 2/1953 | Taylor | 336—135 XR |
| 2,844,802 | 7/1958 | Tripp et al. | 336—123 |
| 2,921,280 | 1/1960 | Litwin et al. | 336—123 XR |
| 3,202,948 | 8/1965 | Farrand | 336—115 |

LEWIS H. MYERS, *Primary Examiner.*

THOMAS J. KOZMA, *Assistant Examiner.*

U.S. Cl. X.R.

310—90